United States Patent
Adolf

(10) Patent No.: US 11,295,212 B1
(45) Date of Patent: Apr. 5, 2022

(54) DEEP NEURAL NETWORKS VIA PHYSICAL ELECTROMAGNETICS SIMULATOR

(71) Applicant: X Development LLC, Mountain View, CA (US)

(72) Inventor: Brian Adolf, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 428 days.

(21) Appl. No.: 16/392,437

(22) Filed: Apr. 23, 2019

(51) Int. Cl.
*G06N 20/00* (2019.01)
*G06N 3/08* (2006.01)
*G06N 3/04* (2006.01)
*G06N 3/00* (2006.01)
*G06N 3/10* (2006.01)

(52) U.S. Cl.
CPC ............. *G06N 3/10* (2013.01); *G06N 3/006* (2013.01); *G06N 3/049* (2013.01); *G06N 3/084* (2013.01); *G06N 20/00* (2019.01)

(58) Field of Classification Search
CPC .......... G06N 3/10; G06N 20/00; G06N 3/049; G06N 3/084; G06N 3/06; G06N 3/063; G06N 3/0635; G06N 3/067; G06N 3/0675
See application file for complete search history.

(56) References Cited

U.S. PATENT DOCUMENTS

| 5,140,670 A | 8/1992 | Chua et al. |
| 5,297,232 A | 3/1994 | Murphy |
| 5,774,693 A | 6/1998 | Hsu et al. |
| 6,772,076 B2 | 8/2004 | Yamamoto et al. |
| 7,398,259 B2 | 7/2008 | Nuget |

(Continued)

FOREIGN PATENT DOCUMENTS

| WO | 2017/176370 A1 | 10/2017 |
| WO | 2017/223560 A1 | 12/2017 |

OTHER PUBLICATIONS

George et al., "Neuromorphic Photonics with Electro-Absorption Modulators," in 27.4 Optics Express 5181-91 (2019). (Year: 2019).*

(Continued)

*Primary Examiner* — Kamran Afshar
*Assistant Examiner* — Ryan C Vaughn
(74) *Attorney, Agent, or Firm* — Christensen O'Connor Johnson Kindness PLLC

(57) ABSTRACT

A system for physically simulating a neural network is described herein. The system includes a plurality of physical voxels configurable to represent nodes of the neural network operating in response to electromagnetic radiation. Each of the physical voxels includes an impedance adjuster, a field detector, and a signal adjuster. The impedance adjuster adjusts impedance to the electromagnetic radiation within a corresponding one of the physical voxels. Weights between nodes of the neural network are based on the adjusted impedance. The field detector measures local field response within the corresponding one of the physical voxels. The local field response is representative of the electromagnetic radiation with the adjusted impedance. The signal adjuster is coupled to receive the local field response and apply an adjustment to the received local field response. The adjustment corresponds to an activation function of the neural network at the corresponding one of the physical voxels.

23 Claims, 5 Drawing Sheets

(56) References Cited

U.S. PATENT DOCUMENTS

| | | | |
|---|---|---|---|
| 8,275,727 | B2 | 9/2012 | Elmegreen et al. |
| 9,589,757 | B1 | 3/2017 | Hannon et al. |
| 2004/0225483 | A1 | 11/2004 | Okoniewski et al. |
| 2010/0312539 | A1 | 12/2010 | Yamagajo et al. |
| 2014/0365188 | A1 | 12/2014 | Doerr |
| 2016/0012176 | A1 | 1/2016 | Liu et al. |
| 2016/0033765 | A1 | 2/2016 | Liu et al. |
| 2016/0174902 | A1 | 6/2016 | Georgescu et al. |
| 2018/0018757 | A1 | 1/2018 | Suzuki |
| 2018/0045953 | A1 | 2/2018 | Fan et al. |
| 2018/0174025 | A1 | 6/2018 | Jin |

OTHER PUBLICATIONS

Chen, R.T. et al., "Neural Ordinary Differential Equations", 32nd Conference on Neural Information Processing Systems (NIPS 2018), Oct. 22, 2018, 18 pages.

Petykiewicz, J. et al., "Active Nanophotonics: Inverse Design and Strained Germanium Light Emitters", A Dissertation Submitted to the Department of Electrical Engineering and the Committee on Graduate Studies of Stanford University, Oct. 2016. 134 pages.

Ying-Shou Lu, J., "Nanophotonic Computational Design", A Dissertation Submitted to the Department of Electrical Engineering and the Committee on Graduate Studies of Stanford University, Jun. 2013, 122 pages.

Piggott, A.Y., "Automated Design of Photonic Devices", A Dissertation Submitted to the Department of Electrical Engineering and the Committee on Graduate Studies of Stanford University, Jun. 2018, 112 pages.

Lu, J. et al., "Nanophotonic Computational Design", Optics Express, vol. 21, No. 11, Jun. 3, 2013, 17 pages.

Piggott, A. Y. et al., "Inverse Design and Implementation of a Wavelength Demultiplexing Grating Coupler", Scientific Reports, Nov. 27, 2014, 5 pages.

Piggott, A.Y. et al., "Inverse Design and Demonstration of a Compact and Broadband On-Chip Wavelength Demultiplexer", Nature Photonics, May 11, 2015, 5 pages.

Piggott, A.Y. et al., "Silicon Photonics: Design Approach to Integrated Photonics Explores Entire Space of Fabricable Devices", Laser Focus World, Aug. 13, 2018, 5 pages.

Piggott, A. Y. et al., "Fabrication-constrained Nanophotonic Inverse Design", Scientific Reports, May 11, 2017, 7 pages.

Su, L. et al., "Inverse Design and Demonstration of a Concept On-Chip Narrowband Three-Channel Wavelength Demultiplexer", ACS Photonics, Aug. 17, 2017, 6 pages.

Su, L et al., Fully-Automated Optimization of Grating Couplers, Optics Express, vol. 26, No. 4m Feb. 2018, 12 pages.

Robinson, J.T., "First-Principle Derivation of Gain in High-Index-Contrast Waveguides", Optics Express, vol. 16, No. 21, Oct. 13, 2008, 11 pages.

Lalau-Keraly, C.M. et al., "Adjoint Shape Optimization Applied to Electromagnetic Design", Optical Society of America, 2013, 9 pages.

Lin, X. et al., "All-Optical Machine Learning Using Diffractive Deep Neural Networks", Science,vol. 361, Issue 6406, Sep. 7, 2008, 20 pages.

Hughes, T. et al., "Training Photonic Neural Networks Through a situ Backpropagation", arXiv:1805.09943v1 [physics. optics, May 25, 2018, 12 pages.

Hopfield, J.J., "Neural Networks and Physical Systems with Emergent Collective Computational Abilities", Pro. natl. Acad. Sci USA vol. 79, Apr. 1982, 6 pages.

Li, J. et al., "Low-Power-Level Passive Harmonic Reradiator for Sensor Nodes", Retrieved from Internet <https://docs.lib.purdue.edu/ecetr/73/?utm_source=docs.lib.purdue.edu%2Fecetr%2F73&utm_medium=PDF&utm_campaign=PDFCoverPages> Oct. 1, 2018, 23 pages.

Tanaka, G. et al., "Recent Advances in Physical Reservoir Computing" A Review, arXiv:1808.04962v3, Apr. 15, 2019, 54 pages.

* cited by examiner

DEEP NEURAL NETWORKS VIA PHYSICAL ELECTROMAGNETICS SIMULATOR

TECHNICAL FIELD

This disclosure relates generally to neural networks, and in particular but not exclusively, relates to physical implementations of neural networks.

BACKGROUND INFORMATION

A neural network is a type of machine learning algorithm which is modeled loosely after the human brain. Advances in neural networks have enabled computer systems to perform complex tasks such as object recognition, machine translation, autonomous vehicles, and the like. However, an inordinate amount of time to train neural networks may be required dependent on the topology of the neural network, the training dataset, and available computational resources. Efforts to reduce the time for neural network training and/or inference has resulted in the development of specialized hardware such as graphic processing units and tensor processing units, which increase the number of parallel calculations available. Continued efforts to further improve the computational speed for inference or training of neural networks remains an important aspect to drive the development and functionally of neural networks.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
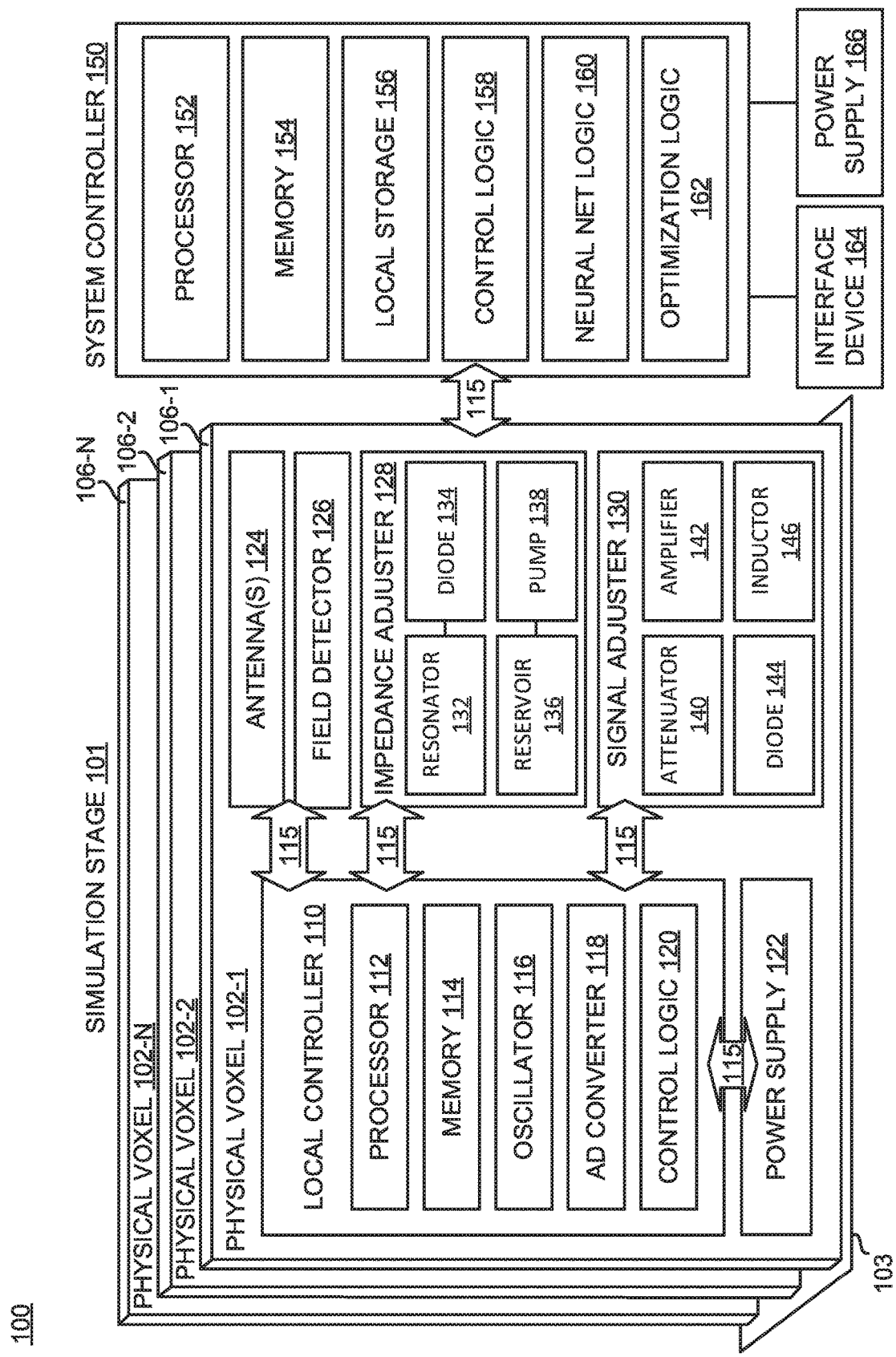
FIG. 1 is a functional block diagram illustrating a system for physically simulating a neural network, in accordance with an embodiment of the present disclosure.

Embodiments of a physical voxel, a system, and a method for physically simulating a neural network for training and inference are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One of the key challenges for neural networks is the considerable computing resources necessary for training and inference. Specialized hardware (e.g., graphic processing units, tensor processing units, etc.) is continuously being developed to increase computational speed and parallelism of the operations performed by a neural network, which are costly both in memory (e.g. RAM) and simulation time (e.g., floating point operations per second). However, rather than running neural network simulations purely in software that require massive amounts of compute and memory for matrix multiplication, for example, embodiments of a system (e.g., volumetric testbed) for physically simulating a neural network are described herein. More specifically, a deep neural network that needs training or is to be used for inference is cast or otherwise defined as an electromagnetic problem that can be described by Maxwell's equations and is physically implementable in real-world hardware. In some embodiments, inference (e.g., forward propagation of a trained neural network) and/or training (e.g., forward propagation, backpropagation, and weight adjustment via an optimization algorithm such as gradient descent) of the neural network may be physically simulated (e.g., operated) within a volumetric testbed that includes a plurality of physical voxels (corresponding to nodes of the neural network) operating in response to electromagnetic radiation (corresponding to input and/or output signals of the nodes).

In some embodiments, each of the physical voxels correspond to individual nodes of the neural network and may be arranged to represent layers (e.g., in x, y, or z directions of a simulation stage included in the system) of the neural network. In one embodiment, a first portion, a second portion, and a third portion of the physical voxels may be respectively configured/arranged to correspond to an input layer, one or more hidden layers, and an output layer of the neural network being physically simulated (e.g., operated). The physical voxels are coupled to communicate wirelessly in which the inputs and outputs of the individual nodes within the neural network propagate via electromagnetic radiation (e.g., radio waves). More specifically, individual physical voxels (e.g., nodes of the neural network) are configured to receive one or more inputs (e.g., electromagnetic radiation at a specific frequency or range of frequencies transmitted by other interconnected physical voxels), apply a transfer function to the received inputs (e.g., measure the electromagnetic radiation, which may intrinsically sum the electromagnetic radiation due to wave interference), apply an activation function (e.g., adjust the measured electromagnetic radiation dependent on a magnitude of the measurements), and transmit one or more outputs (e.g., transmit modified electromagnetic radiation at the frequency with a phase or amplitude adjusted in accordance with the transfer function and activation function).

In some embodiments, the physical voxels corresponding to the input layer are configured to transmit electromagnetic radiation having a specified waveform and spatial profile to correspond to initial inputs of the neural network. Physical voxels corresponding to the one or more hidden layers may each have an adjustable material property (e.g., index of refraction, dielectric constant, resonance frequency, etc.) that may cause an adjustment of impedance to the electromagnetic radiation received at a particular physical voxel. Thus, weights between nodes of the neural network are based, at least in part, on impedance differentials between the physical voxels. Individual physical voxels measure the received electromagnetic radiation with adjusted impedance as a local field response within a corresponding one of the physical voxels. Measuring the local field response may correspond to applying a transfer function (e.g., taking a sum and/or matrix multiplication of inputs that have been modified by weights between individual nodes). An adjustment may then be applied to the received local field response (e.g., a non-linear adjustment dependent on the input, which may be similar to a sigmoid, ReLu, softmax, tanh or other type of activation function). The modified or adjusted local field response is then output as modified electromagnetic radiation to be received by interconnected physical voxels, which corresponds to an output of the particular physical voxel (e.g., node of the neural network).

Advantageously, a physical implementation of neural networks cast as an electromagnetic problem may leverage the propagation speed of electromagnetic radiation (i.e., the speed of light) which may enable faster operational performance relative to traditional computations. Thus, rather than only utilizing traditional compute operations (e.g., matrix multiplication, summation, etc.) during forward and backpropagation stages of a neural network, embodiments described herein utilize the transmission, propagation, and measurement of electromagnetic radiation (or the resultant electric and/or magnetic field due to the electromagnetic radiation) in conjunction with physical voxels representative of nodes of the neural network to intrinsically determine the solution (e.g., in regards to training and/or inference) of the neural network. Moreover, the physical implementation of neural networks described in embodiments of the disclosure may allow for greater expressive capabilities through controllable and configurable properties defined by the physical voxels (e.g., topologies, weights, activation functions, and degree of interconnectedness of the neural network) and the transmitted electromagnetic radiation (e.g., multiplexing input conditions or input signals to properties of the electromagnetic radiation such as mode, frequency, and/or direction of propagation).

FIG. 1 is a functional block diagram illustrating a system 100 (e.g., a volumetric testbed) for physically simulating a neural network, in accordance with an embodiment of the present disclosure. The system 100 provides for training of neural networks and/or inference with trained neural networks in which the neural network is cast as an electromagnetic problem governed by Maxwell's equations. It is appreciated that system 100 is not limited to physically simulating neural networks of a particular topology or type, but rather that system 100 is configurable to physically simulate a variety of neural network types and/or topologies, and that representative neural networks discussed herein are merely illustrative of the capabilities of system 100.

In the illustrated embodiment, system 100 is a volumetric testbed that includes simulation stage 101 and system controller 150 coupled to interface device 164 and power supply 166. The simulation stage 101 includes a plurality of physical voxels 102 (e.g., physical voxel 102-1, physical voxel 101-2, up to physical voxel 101-N, where N corresponds to the total number of physical voxels within the simulation stage 101) and a baseplate 103. The physical voxels 102 are arranged in an M-dimensional array (where M corresponds to 1, 2 or 3 depending on a desired neural network topology) to physically simulate a deep neural network. Each of the physical voxels 102 includes a local controller 110, power supply 122, antenna(s) 124, field detector 126, impedance adjuster 128, and signal adjuster 130 disposed in or on the frame 106 of a respective one of the physical voxels 102. The local controller 110 is coupled to power supply 122, antenna(s) 124, field detector 126, impedance adjuster 128, and signal adjuster 130 via one or more interconnects 115. Local controller 110 includes processor 112, memory 114, oscillator 116, analog-to-digital (AD) converter 118, and control logic 120 coupled to one another. Impedance adjuster 128 may include resonator 132 coupled to diode 134 and/or a reservoir 136 coupled to pump 138. Signal adjuster 130 may include attenuator 140, amplifier 142, diode 144, and inductor 146, which may be coupled to one another or various other components of system 100. System controller 150 is coupled to each of the physical voxels 102 and includes processor 152, memory 154, local storage 156, control logic 158, neural network logic 160, and optimization logic 162 coupled to one another.

Each of the physical voxels 102 is a controllable real-world (i.e., physical) voxel that may be representative of an individual node within the neural network being physically simulated. Each of the physical voxels 102 has a discrete shape provided by frame 106 and represents a unit spatial element of material property within the simulation stage 101. Frame 106 may define an overall shape of each of the physical voxels 102 that allows for the physical voxels 102 to be collectively arranged or stacked as a one, two, or three-dimensional arrangements within simulation stage 101 to be representative of the neural network topology. Various data and power connectors/links may be included in or on frame 106 such that individual physical voxels may interface (e.g., communicate via the connectors) with other physical voxels 102, the baseplate 103, and/or system controller 150. Frame 106 may be comprised of a material substantially transparent to electromagnetic radiation (e.g., at one or more frequencies of interest, such as frequencies within a radio frequency range of the electromagnetic spectrum). Baseplate 103 may represent a platform for which the physical voxels 102 may be placed upon. Power (e.g., wired or wirelessly) may be delivered to the physical voxels 102 via the baseplate 103 which may be coupled to power supply 166.

Local controller 110 includes processor 112 coupled to memory 114 which may include instructions and/or logic (e.g., control logic 120) to choreograph operation of the individual physical voxels for physically simulating the neural network. Each of the physical voxels 102 may be configured to transmit and/or receive electromagnetic radiation via antenna 124 operated via the local controller 110.

The electromagnetic radiation (e.g., corresponding to inputs or outputs of individual nodes during forward propagation and/or backpropagation operations of the neural network) may be locally sampled by field detector 126 and corresponds to a local field response (e.g., during forward propagation) or local loss (e.g., during backpropagation) response within the individual physical voxel. The field detector 126 is coupled to local controller 110 to measure the local field response and/or the local loss response (e.g., electric and/or magnetic field vectors locally in one or more directions, such as three orthogonal directions, as the electromagnetic radiation propagates through the simulation stage 101) at a corresponding one of the physical voxels 102. The field detector 126 may include a stub dipole antenna and/or a loop antenna to measure the electric and/or magnetic field vectors, respectively. The local field response and/or local loss response may be sampled at each of the physical voxels 102 directly if the sampling rate is high enough, or via mixing and down-conversion (e.g., heterodyning) in analog before the signal is sent to AD converter 118 for processing. It is noted that each of the physical voxels 102 and corresponding local controller 110 may share a common phase reference, which may be provided by local oscillator signal 116 (e.g., provided by an oscillator locally located within the local controller 110, system controller 150, or otherwise). In other embodiments, the phase reference common to each of the physical voxels 102 may come from a wireless signal, GPS, optical signal, or the like.

Impedance adjuster 128 is configurable to change a material property of an individual one of the physical voxels 102 that may be controlled to adjust impedance to electromagnetic radiation within a corresponding one of the physical voxels 102. In one embodiment, the measured field response is influenced by the material property of the physical voxels 102, which corresponds to the impedance of the physical voxels 102. In other words, the impedance (due to the particular material property of the physical voxels 102 provided by the impedance adjuster 128) is configurable or otherwise adjustable (based on a set point of the material property). Thus, the measurement of the local field response is representative of the electromagnetic radiation in a presence of the impedance. Weights between nodes of the neural network are based, at least in part, on the adjusted impedance. The change in impedance may be accomplished by resonator 132 (e.g., split-ring resonator or otherwise) configurable by a PIN diode 134 to shift a resonance frequency of the resonator. Alternatively or in addition, the index of refraction or dielectric constant of the individual physical voxels included in the physical voxels 102 may also be utilized to adjust the impedance. The index of refraction (or dielectric constant) of an individual one of the physical voxels 102 may be controlled by a pump 138 operably coupled to a reservoir 136 that pumps in different fluids having different refractive indexes, dielectric constants, or other material properties (e.g., ferrofluid vs non-ferrofluid). In some embodiments, the reservoir may have a fixed and/or rigid shape that comprises the majority of the space of the individual physical voxels. In other embodiments, the reservoir is an expandable sack that changes size based on the amount of fluid within the sack.

Signal adjuster 130 is coupled to receive the local field response measured by field detector 126 and apply an adjustment to the received local field response that corresponds to an activation function of the neural network at a corresponding one of the physical voxels. The signal adjuster includes an attenuator (e.g., a non-linear attenuator) or an amplifier (e.g., variable gain amplifier) coupled to a diode (e.g., a PIN diode, a Schottky diode, a Zener diode, varactor diode, etc.) or an inductor (e.g., including a saturable or hysteric material such as a ferrite-core) that provides the adjustment via rectification (e.g., with diode 144) or saturation (e.g., with inductor 146). More specifically, the signal adjuster provides a non-linearity acting on incoming fields (e.g., electromagnetic radiation transmitted by one or more physical voxels) that subsequently transfer that non-linearity to an outgoing field (e.g., electromagnetic radiation output by a corresponding physical voxel).

Power supply 122 is coupled to local controller 110 to provide power to each of the physical voxels 102 for powering the various components. The power supply 122 may include charging circuitry such that the physical voxels 102 may be wirelessly charged. A battery or capacitor may be included within the power supply 122 to provide an energy storage element. Alternatively or in addition, the physical voxels 102 may be powered by a central power supply (e.g., provided by power supply 166 of system controller 150).

It is appreciated that each of the physical voxels 102 may not be identical in terms of components. Depending on the arrangement of the physical voxels 102, certain physical voxels may have different roles or functionality within the simulation stage 101. In some embodiments, the impedance adjuster 128 may include either resonator 132 and pin diode 134 or reservoir 136 and pump 138, rather than both. Similarly, signal adjuster 130 may not necessarily include both an attenuator and an amplifier. By specifically catering the design of the individual physical voxels 102 to the specified function of the physical voxel 102 a significant manufacturing cost savings may be achieved.

System controller 150 orchestrates the operation of the volumetric testbed 100 for physically simulating the neural network. Processor 152 (e.g., one or more central processing units, graphics processing units, and/or tensor processing units, etc.), memory 154 (e.g., volatile memory such as DRAM and SRAM, non-volatile memory such as ROM, flash memory, and the like), local storage (e.g., magnetic memory such as computer disk drives), control logic 158, neural network logic 160, and optimization logic 162 are coupled to one another (e.g., via a communication bus). The system controller 150 includes software (e.g., instructions included in memory 154 coupled to processor 152) and/or hardware logic (e.g., application specific integrated circuits, field-programmable gate arrays, and the like) that when executed by the system controller 150, the local controller 110, and/or the system 100 causes the system 100 to perform operations. The operations may be based on any one of, or a combination of, instructions stored within or based on memory 114, memory 154, local storage 156, and/or logic (e.g., control logic 120, control logic 158, neural network logic 160, and optimization logic 162).

In the illustrated embodiment, control logic 158, neural network logic 160, and optimization logic 162 are utilized to physically simulate the neural network. The control logic 158 provides instructions for controlling or configuring the various components within system 100. The neural network logic 160 provides instructions for physically simulating the neural network, such as configuring individual physical voxels (e.g., as a phased array antenna) to transmit electromagnetic radiation having a specified waveform and spatial profile, measuring local field response and local loss response, etc. The optimization logic 162 provides instructions for training the neural network, including, but not limited to, forward propagation, backpropagation, adjusting weights between nodes of the neural network based on an optimization algorithm such as gradient descent, adjusting an impedance of individual ones of the physical voxels 102 to reduce the loss signal, configuring the signal adjuster to apply a particular activation function to received electromagnetic radiation, and the like.

System controller 150 is coupled to interface device(s) 164 to allow a user to interact with system 100, such as performing an initial configuration or set up of the simulation stage 101, adjusting parameters, settings, and/or material properties of the physical voxels 102 for physically simulating the neural network, and/or viewing a status of the physical simulation during inference or training of the neural network. The interface device 164 may include a display (e.g., a light emitting diode display, a liquid crystal display, and the like) to display information to the user utilizing system 100 and an input device (e.g., a mouse, trackball, keyboard, stylus, or other computer peripheral) to facilitate an interaction between the user and system 100.

Figure 2A:
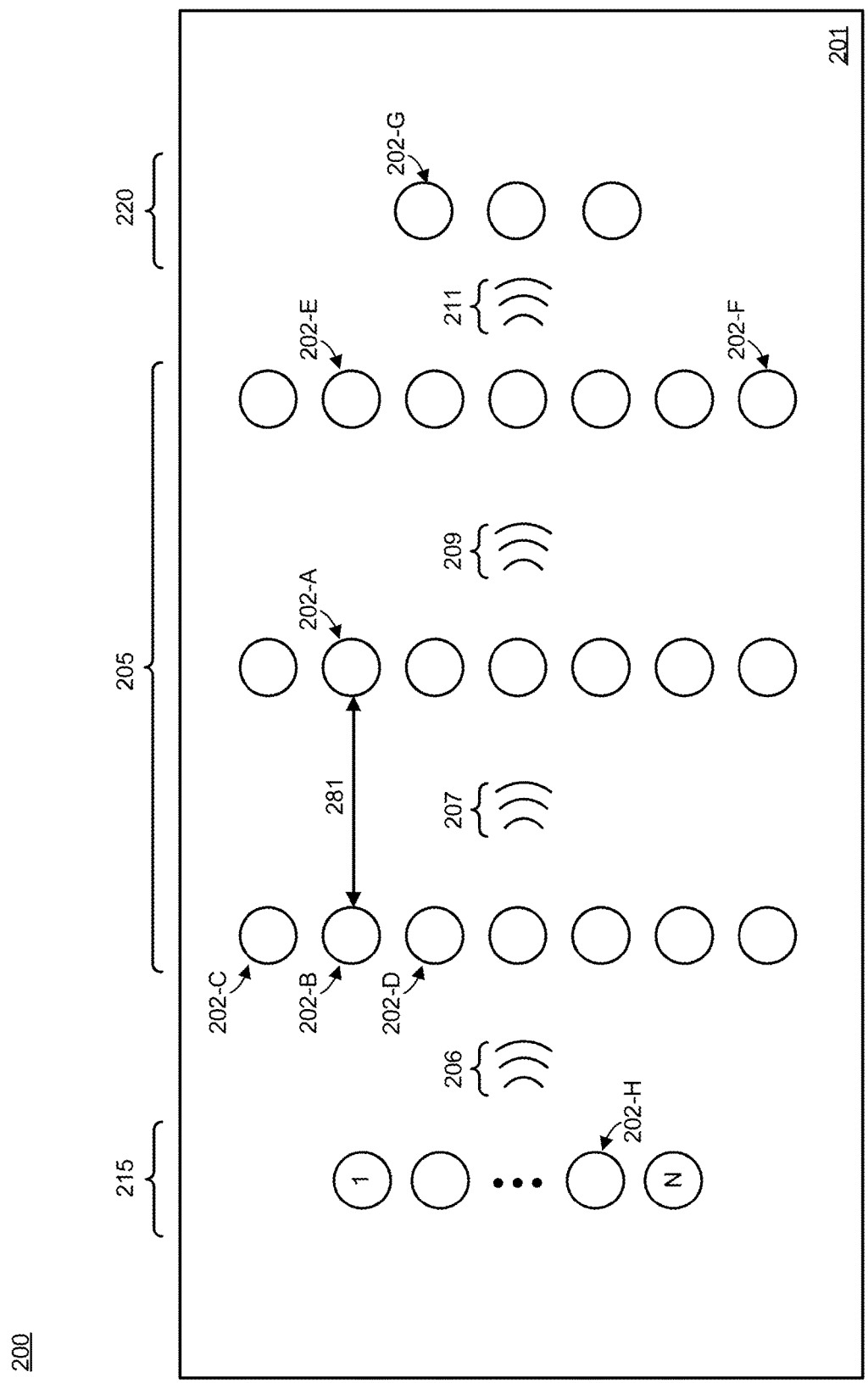
FIG. 2A illustrates an arrangement of physical voxels to be representative of a topology of a neural network, in accordance with an embodiment of the present disclosure.

FIG. 2A illustrates a system 200 including a plurality of physical voxels 202 (e.g., physical voxels 202-A, 202-B, 202-C, 202-D, 202-E, 202-F, 202-G, and 202-H, which may be one possible implementation of physical voxels 102 illustrated in FIG. 1) arranged to be representative of a topology of a neural network being physically simulated, in accordance with an embodiment of the present disclosure. System 200 is one possible implementation and/or configuration of system 100 illustrated in FIG. 1. As illustrated in FIG. 2A, physical voxels 202 are arranged in columns corresponding to an input layer 215, hidden layers 205, and output layer 220 of a neural network being physically simulated. It is appreciated that the illustrated embodiment is a two-dimensional arrangement of physical voxels, but that in other embodiments the physical voxels 202 may include an added dimensionality (e.g., into or out of the page illustrative of FIG. 2A) to provide a three-dimensional representation of the neural network. The input layer 215 may include one or more physical voxels 202 (e.g., physical voxel 202-H) that are coupled to transmit electromagnetic radiation 206 that correspond to source or initial input signals of the neural network. Multiple input signals may be output towards the subsequent layers of the neural network (e.g., the voxels within the hidden layer 205 and/or output layer 220) and correspond to electromagnetic radiation transmitted by individual physical voxels 202 (e.g., nodes) within the input layer 215 (e.g., as a phased array antenna provided collectively by more than one of the physical voxels). Additionally or alternatively, multiple inputs may be output based on a profile of the electromagnetic radiation 206 (e.g., phase, frequency, and/or mode). Physical voxels 202 within the hidden layers 205 receive the input signals (e.g., via measuring a local field response corresponding to the electromagnetic radiation 206 with the physical voxel 202 with a field detector) and may provide an output signal (e.g., transmitted electromagnetic radiation 207, 209, and 211) that is representative of the electromagnetic radiation 206 modified by an impedance adjuster (e.g., impedance adjuster 128 of FIG. 1) and/or a signal adjuster (e.g., signal adjuster 130) that respectively corresponds to the application of a transfer function (e.g., summation of the inputs) and an activation function (e.g., a non-linear function with an output dependent on the magnitude of the summation). More specifically, the activation function standardizes the resultant summation (e.g., sigmoid, ReLu, and the like) to be within a pre-determined range of values.

The physical voxels 202 are representative of nodes of the neural network and are wirelessly interconnected with one another dependent on the topology of the neural network being physically simulated. The degree of interconnectedness between nodes of the neural network is based, at least in part, on a spatial (e.g. material) property within the physical voxel, a separation distance between physical voxels 202, and a magnitude of transmitted electromagnetic radiation. In some embodiments, the spatial property of the physical voxels corresponds to the impedance adjustment provided by an impedance adjuster (e.g., impedance adjuster 128 of FIG. 1), which may be a configurable material property (e.g., adjustable index of refraction or resonant frequency) within a corresponding one of the physical voxels 202. The degree of interconnectedness between physical voxels (i.e., nodes of the neural network) is also based on the magnitude of the transmitted electromagnetic radiation (e.g., electromagnetic radiation 206, 207, 209, and 211) and separation distances between physical voxels 202, since the strength of signal propagation scales inversely with distance. In one embodiment, physical voxel 202-B is separated from physical voxel 202-A by separation distance 281. The separation distance 281 may determine whether physical voxel 202-B is interconnected with physical voxel 202-A. Thus, the physical voxels 202 may be arranged in accordance with a desired topology of a neural network (e.g., distance between nodes may be increased or decreased dependent on desired neural network topology). In some embodiments, it may be desirable for each of the physical voxels 202 to be interconnected with each other physical voxel 202, which may be representative of a neural network topology similar to a Hopfield artificial neural network. In other embodiments, there may be shielding (e.g., RF shielding) within physical voxels 202 that isolate the individual layers of the neural network from one another such that a topology similar to a feed forward deep neural network may be physically simulated. In yet other embodiments, each of the physical voxels 202 may generate outputs (e.g., transmitted electromagnetic radiation) based on received inputs and a previous state of the particular physical voxel 202, which may allow for physically simulating a recurrent neural network topology. In general, the physical voxels 202 may be arranged or otherwise configured to physically simulate a variety of neural network topologies.

Figure 2B:
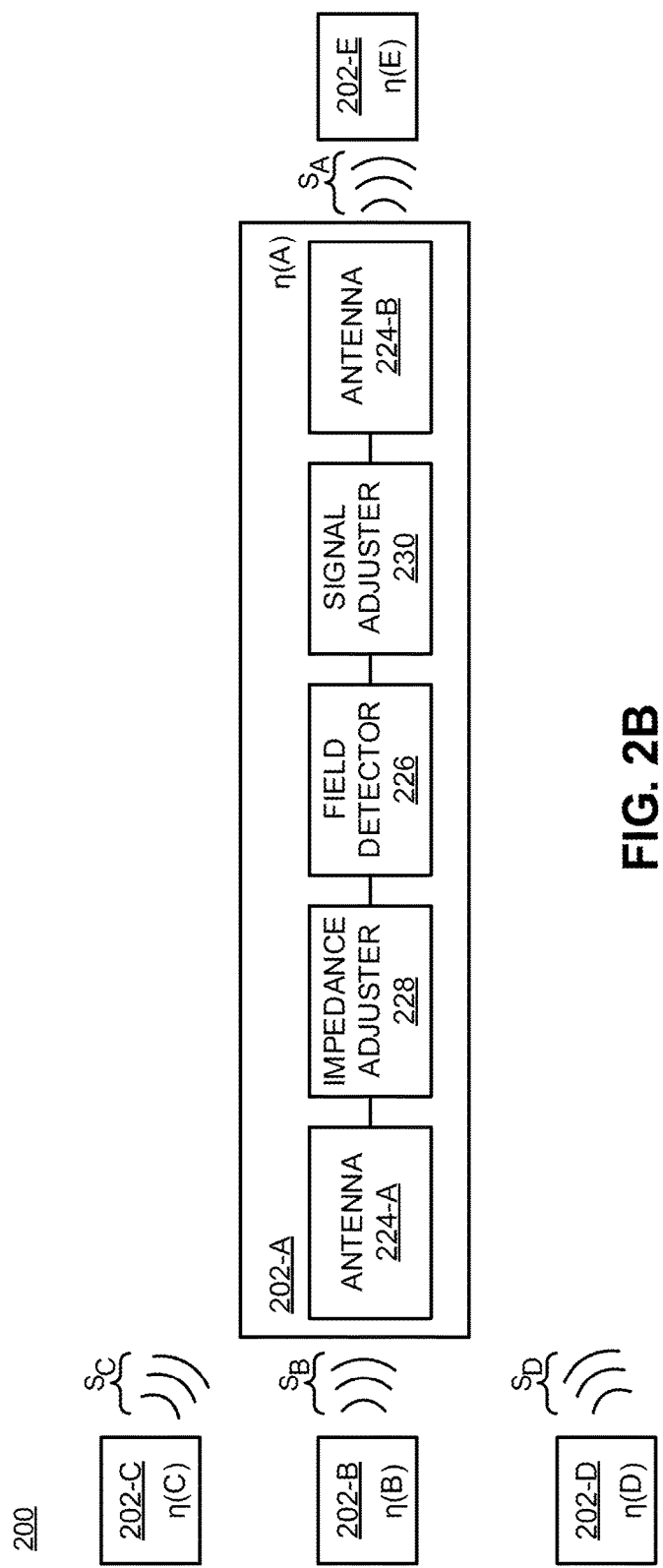
FIG. 2B illustrates an example physical voxel operating as a node of a neural network, in accordance with an embodiment of the present disclosure.

FIG. 2B illustrates an example physical voxel 202-A within system 200 operating as a node in a neural network being physically simulated during forward propagation (e.g., for inference or training), in accordance with an embodiment of the present disclosure. However, it is appreciated that the following description may also be used to describe operation of a physical voxel during backpropagation when physically simulating a neural network.

Figure 3A:
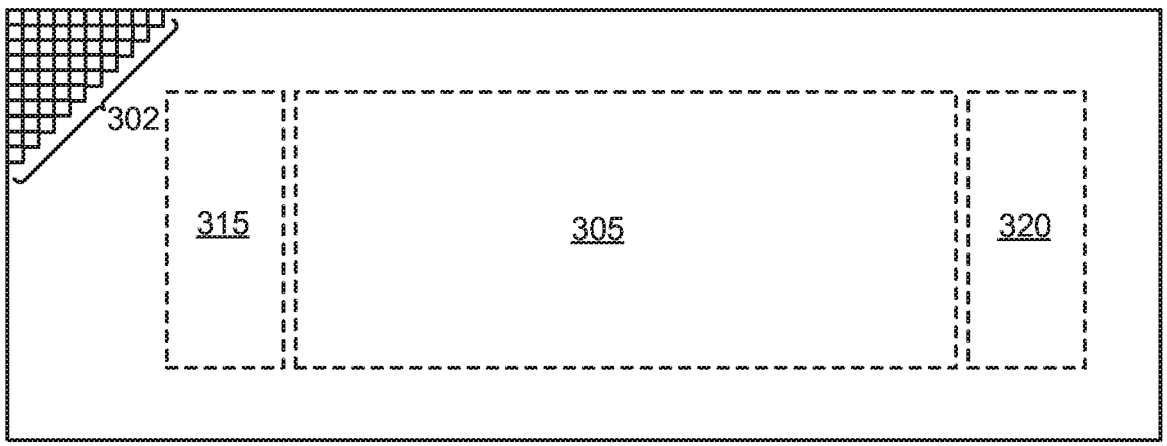
FIG. 3A illustrates an example of a simulation stage including an arrangement of physical voxels to physically simulate a neural network, in accordance with an embodiment of the present disclosure.

As illustrated in FIG. 2B, system 200 includes a plurality of physical voxels 202 (e.g., 202-A, 202-B, 202-C, 202-D, and 202-E) configured to represent nodes of a neural network operating in response to electromagnetic radiation (e.g., $S_A$, $S_B$, $S_C$, and $S_D$). Thus, in the illustrated embodiment, physical voxel 202-A is interconnected with physical voxel 202-B, 202-C, 202-D, and 202-E. Physical voxel 202-A is representative of a node within a hidden layer of the neural network (e.g., as illustrated in FIG. 3A) and coupled to receive a plurality of input signals (e.g., $S_B$, $S_D$, $S_E$), which correspond to electromagnetic radiation output by nearby physical voxels 202-B, 202-C, and 202-D. In other words, the output of physical voxel 202-B, 202-C, and 202-D correspond to inputs for physical voxel 202-A (e.g., propagation of information through the neural network). More specifically, the electromagnetic radiation (e.g., $S_B$, $S_C$, and $S_D$) corresponds to output of other nodes of the neural network (e.g., physical voxel 202-B, 202-C, and 202-D, respectively) that propagate to physical voxel 202-A in the presence of an (adjustable) impedance that is based, at least in part, on an impedance difference between the interconnected physical voxels. For example, physical voxel 202-C includes an impedance adjuster (e.g., impedance adjuster 128 of FIG. 1) with an impedance adjustment amount set to $\eta(C)$, which is based on a configurable material property of physical voxel 202-C (e.g., index of refraction, resonance frequency, and the like). Similarly, physical voxel 202-B includes impedance adjuster 228, which may be analogous to impedance adjuster 128 of FIG. 1, with an impedance adjustment amount set to η(B). Thus, measurements of electromagnetic radiation propagating from physical voxel 202-C to physical voxel 202-B is influenced by both material properties η(B) and η(C) that respectively correspond to physical voxels 202-B and 202-C. These material properties are configurable and are accordingly correlated to the weight (in a neural network sense) between two nodes (e.g., physical voxel 202-B and 202-C). In other words, weights between nodes of the neural network are adjustable/configurable in a controllable manner and are based, at least in part, on the adjusted impedance (e.g., provided by an impedance adjuster configuring the material properties of the individual physical voxels).

In the illustrated embodiment of FIG. 2B, physical voxel 202-A receives the electromagnetic radiation (e.g., input signals corresponding to transmitted electromagnetic radiation signals $S_B$, $S_C$, and $S_D$ that share a common transmission frequency) and measures a local field response (e.g., electric and/or magnetic field in one or more orthogonal directions) within physical voxel 202-A via field detector 226 (e.g., field detector 126 of FIG. 1). The field detector 226 includes antenna 224-A (e.g., a detector antenna) to measure the local field response. The measurements of the local field response is representative of the electromagnetic radiation in the presence of the adjusted impedance (e.g., as influenced by a set point of an impedance adjuster). The measurement of the local field response may be analogous to applying a transfer function (e.g., taking a summation of inputs modified by weights of the neural network) due to the interference (constructive or destructive) of electromagnetic waves. Therefore, when measuring signals ($S_B$, $S_C$, and $S_D$) sharing a common frequency, the resultant measurement (e.g., from field detector 226) corresponds to a summation of the signals each having an impedance modified by a material property of the respective physical voxels 202.

Physical voxel 202-A includes signal adjuster 230 (e.g., signal adjuster 130 illustrated in FIG. 1) coupled to field detector 226 to receive the local field response and apply an adjustment to the received local field response. The adjustment may correspond to a non-linear adjustment based or otherwise dependent on the magnitude of the received local field response that corresponds to an activation function (e.g., similar to a sigmoid, ReLu, tanh, or other neural network activation functions) that parameterizes the received field response to have a magnitude between a pre-determined range of values. In some embodiments, the signal adjuster 230 includes at least one of an attenuator, a variable gain amplifier, a diode, or an inductor to provide the nonlinear adjustment to the received local field response. In one embodiment, signal adjuster 230 includes a ferrite-core coupled to antenna 224-B (e.g., antenna 224-B loops around a ferrite-core) to apply the adjustment to the received local field response. Physical voxel 202-A further includes antenna 224-B coupled to signal adjuster 230 to output modified electromagnetic radiation, $S_A$, which is representative of the local field response modified by the signal adjuster 230. The modified electromagnetic radiation, $S_A$, corresponds to an output of the physical voxel 202-A (e.g., an output of a particular node within the neural network based on received inputs, application of a transfer function, and application of an activation function), which is to be received by physical voxel 202-E. In some embodiments, antenna 224-A and antenna 224-B are the same antenna that is coupled to both field detector 226 and signal adjuster 230 to both measure the local field response and transmit the modified electromagnetic radiation (e.g., a shared antenna). In the same or other embodiments, the neural network physically simulated by system 200 operates in response to electromagnetic radiation at a first frequency (e.g., input signals from an input layer of the neural network as illustrated in FIG. 3A correspond to electromagnetic radiation at the first frequency). The resultant modified electromagnetic radiation (e.g., $S_A$) is transmitted (e.g., via antenna 224-B) at a second frequency substantially equal to the first frequency. Thus, the modified electromagnetic radiation (e.g., $S_A$) is representative of the electromagnetic radiation (e.g., input signals and/or $S_B$, $S_C$, and $S_D$) with at least one of a phase or amplitude adjusted by the impedance adjuster (e.g., impedance adjuster 228) and signal adjuster (e.g., single adjuster 230).

Figure 2C:
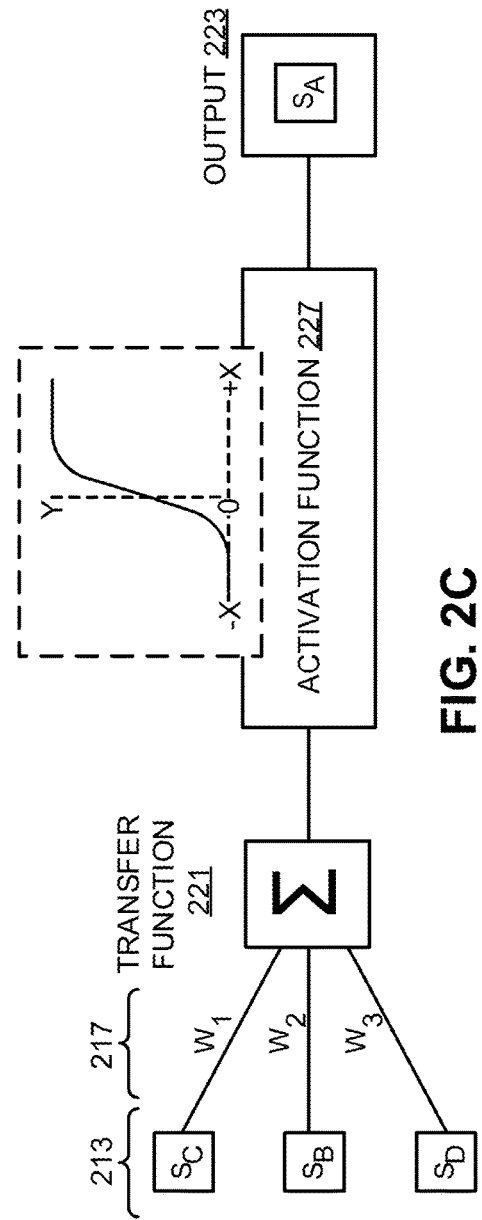
FIG. 2C is a chart illustrating a relationship between input signals received and a corresponding output signal transmitted by a physical voxel representing a node of a neural network, in accordance with an embodiment of the present disclosure.

FIG. 2C is a chart illustrating a relationship between input signals 213 (e.g., $S_B$, $S_C$, and $S_D$) received by a physical voxel and a corresponding output signal (e.g., $S_A$) transmitted by the physical voxel 202 representing a node of a neural network, in accordance with an embodiment of the present disclosure. As illustrated, a physical voxel (e.g., physical voxel 202-A) receives a plurality of input signals corresponding to transmitted electromagnetic radiation (e.g., $S_B$, $S_C$, and $S_D$) that are each modified by weights 217 (e.g., impedance differences based on the impedance adjustments, η, of interconnected physical voxels). The physical voxel applies a transfer function 221 (e.g., measures the electromagnetic radiation, which may correspond to matrix multiplication of the input signals 213 with respect to the weights 217) to the received input signals. The electromagnetic radiation is measured (e.g., as a signal corresponding to electric or magnetic field vectors in one or more orthogonal directions) and corresponds to a local field response. The local field response is representative of the electromagnetic radiation measured in a presence of an (adjustable) impedance within the physical voxel. The physical voxel subsequently applies an activation function 227 to the received local field response (e.g., before or after measurement of the local field response) to parameterize the magnitude of the received measurement to be within a pre-determined range of values that is non-linearly dependent on the initial magnitude of the received local field response. The resultant output 223 is then output by the physical voxel as modified electromagnetic radiation (e.g., $S_A$)

Figure 3B:
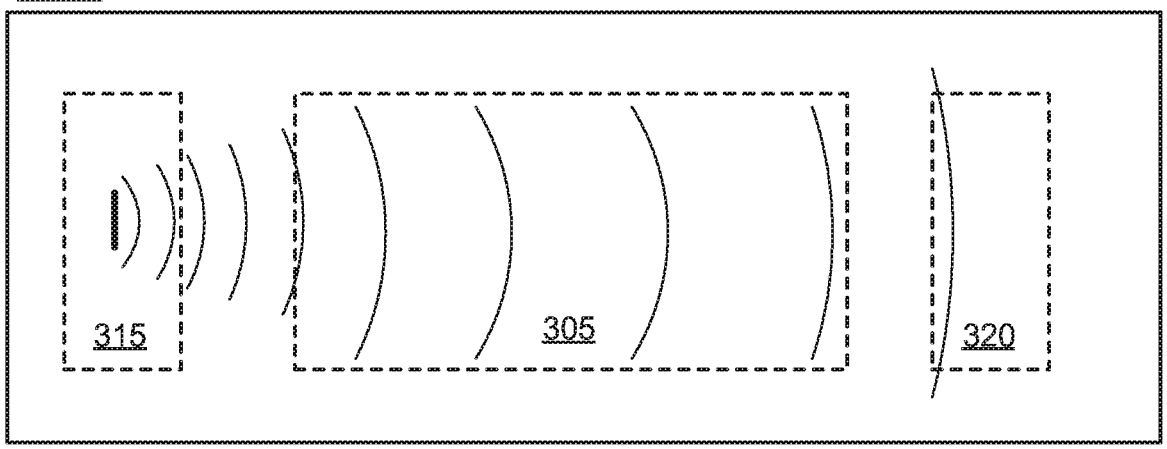
FIG. 3B illustrates performing forward propagation of a neural network via the physical voxels, in accordance with an embodiment of the present disclosure.
Figure 3C:
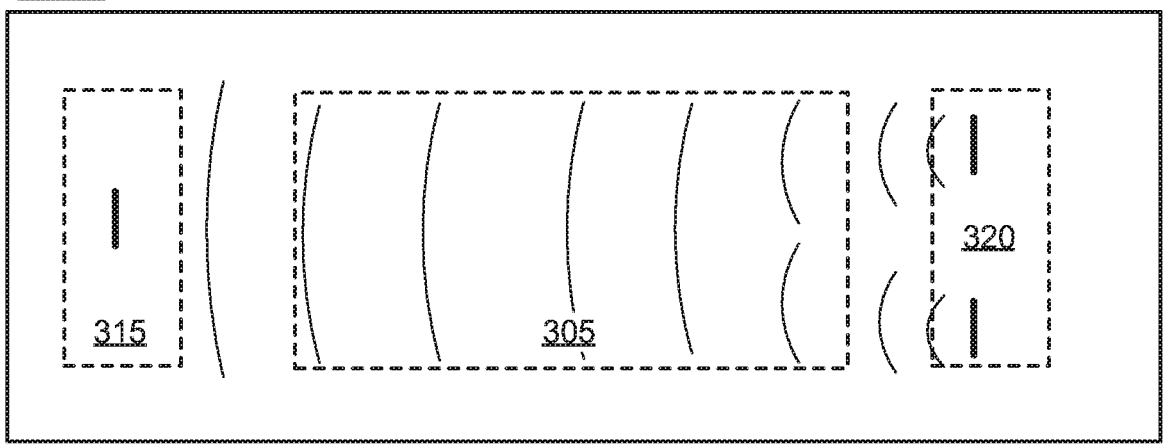
FIG. 3C illustrates performing backpropagation of a neural network via the physical voxels, in accordance with an embodiment of the present disclosure.

FIGS. 3A-3C illustrate an initial set up and arrangement of the physical voxels 302 (e.g., the physical voxels 102 of FIG. 1) within a simulation stage 301 (e.g., the simulation stage 101 of FIG. 1) to physically simulate a neural network, performing a forward propagation of the neural network (e.g., transmitting electromagnetic radiation from an input layer 315, which corresponds to initial input of the neural network), and performing backpropagation of the neural network (e.g., transmitting electromagnetic radiation from an output layer 320, which corresponds to a loss signal) for determining loss gradients of the neural network to update the weights of the neural network. The one, two, or three-dimensional arrangement and set up of the physical voxels 302, forward propagation, backpropagation, and weight updating of the neural network may be achieved via system 100 illustrated in FIG. 1. As illustrated in FIGS. 3A-3C, the simulation stage 201 and subsequent arrangement of physical voxels 302 is represented in two-dimensions for the sake of clarity, however it is appreciated that physical voxels 302 are three-dimensional objects (e.g., a cube or other stackable volumetric shapes that may be defined by a frame of each of the physical voxels) that may have various arrangements within the simulation stage 301 (e.g., the physical voxels 302 may be arranged as a 100×100×100 three-dimensional array, as a two-dimensional array, a 1-dimension array, or otherwise) to physically simulate the neural network. It is further noted that only a portion of the physical voxels 302 are illustrated to avoid obscuring certain aspects of the disclosure.

FIG. 3A illustrates an example arrangement of a plurality of physical voxels 302 (e.g., the physical voxels 101 illustrated in FIG. 1) to be representative of a topology of a neural network for physically simulating the neural network, in accordance with an embodiment of the present disclosure. The simulation stage 301-A represents the simulation stage 301 at an initial set point or configuration state for physically simulating the neural network. The physical voxels 302 are arranged within the simulation stage 301 and are representative of a topology of the neural network with individual physical voxels 302 corresponding to nodes of the neural network.

In the illustrated embodiment, the simulation stage 301 includes a hidden layer region 305 positioned between an input layer region 315 and an output layer region 320. A first portion (e.g., a pre-determined number) of the physical voxels 302 is positioned within the input layer region 315 and may correspond to an input layer of a neural network being physically simulated. A second portion (e.g., a pre-determined number) of the physical voxels 302 may be positioned within the hidden layer region 305 and correspond to one or more hidden layers of the neural network being physically simulated. A third portion of the physical voxels 302 is positioned within the output layer region 320 and corresponds to an output layer of the neural network. The arrangement of the physical voxels 302 may also include updating or configuring a material property (e.g., index of refraction, resonant frequency, dielectric constant, or the like) of each of the physical voxels 302 to define/describe initialization parameters of the neural network (e.g., values of weights interconnecting nodes, transfer function, activation function, topology, and the like).

The input layer region 315 may be configured to transmit electromagnetic radiation having a specified spatial profile at one or more frequencies (e.g., the first frequency), which is representative of inputs of the neural network being physically simulated and is directed through the hidden layer region 305 and towards the output layer region 320. The output layer region 320 may be utilized to compare an output signal response to a desired output signal response to determine a loss signal. To train the neural network (e.g., update weights to reduce loss signal value) the output layer region 320 may also be configured to output loss electromagnetic radiation (representative of the loss signal) towards the input layer region 315. The hidden layer region 305 is positioned between the input layer region 315 and the output layer region 320 and provides for inputs (e.g., electromagnetic radiation from the input layer region 315) to propagate through the hidden layer region 305 (e.g., as modified electromagnetic radiation that is actively or passively retransmitted from individual nodes) towards the output layer region 320 (or vice versa in the case of the loss signal being transmitted from the output layer region 320 to the input layer region 315 to update the weights between nodes).

FIG. 3B illustrates performing forward propagation of inputs of the neural network via the physical voxels 302, in accordance with an embodiment of the present disclosure. During the forward propagation, the first portion of the physical voxels 302 (e.g., the physical voxels 302 disposed within the input layer region 315) is configured (e.g., as a phased-array antenna) to transmit electromagnetic radiation (e.g., one or more inputs of the neural network) towards the third portion of the physical voxels 302 (e.g., the physical voxels 302 disposed within the output layer region 320).

In response to the electromagnetic radiation, the physical voxels 302 within the hidden layer region 305 receive the electromagnetic radiation and subsequently transmit modified electromagnetic radiation to propagate the inputs through the neural network being physically simulated towards the physical voxels 302 within the output layer region 320. This is achieved by measuring the local field response within each of the physical voxels within at least the hidden layer region 305. The local field response is representative of the electromagnetic radiation with an adjusted impedance (e.g., determined, at least in part, by an impedance adjuster). The local field response at each of the physical voxels 302 may be measured or sampled in real-time, over a time period (e.g., until a steady state is reached), or for other durations to determine the local field response. Once the modified electromagnetic radiation reaches the physical voxels within the output layer region 320, the output response (e.g., the local field response at each of the corresponding voxels representative of nodes within the output layer of the neural network) is measured and compared to a desired output signal. The measured output signal and desired output signal are compared to determine a loss signal. The loss signal may subsequently be utilized to perform backpropagation for determining the gradients (e.g., error or loss gradients of the loss function) of the neural network for updating the weights (e.g., physical material parameter of the individual voxels 302) to reduce the loss signal.

FIG. 3C illustrates performing backpropagation (e.g. of error) of a neural network via the physical voxels 302, in accordance with an embodiment of the present disclosure. During the backpropagation, the third portion of the physical voxels 302 (e.g., the physical voxels 302 disposed within the output layer region 320 of the neural network) is configured to transmit loss electromagnetic radiation (e.g., the loss signal) towards the first portion of the physical voxels 302 (e.g., the physical voxels 302 disposed within the input layer region 315) to determine loss gradients of the neural network.

The loss signal is backpropagated through hidden layer region 305 in a manner similar to forward propagation, in which the physical voxels 302 within the hidden layer region 305 receive the loss electromagnetic radiation (modified by a material parameter of the physical voxels 302) and transmit modified loss electromagnetic radiation to adjacent physical voxels 302. Thus, each of the physical voxels 302 within the hidden layer region 305 measures a local loss response that represents the loss electromagnetic radiation modified by the impedance of an individual one (or more) of the physical voxels. The local loss response at each of the physical voxels 302 may be measured or sampled in real-time, over a time period (e.g., until a steady state is reached), or for other durations to determine gradients of the neural network that may be stored in memory (e.g., at memory 114, memory 154, or local storage 156 of system 100 illustrated in FIG. 1).

Once loss gradients of the neural network are known, the weights between individual voxels may be updated (e.g., via an optimization algorithm such as gradient descent) to reduce the loss signal. Weights of the neural network may be changed by changing the material property of the one or more physical voxels 302 to adjust the wave impedance. Iterative cycles of performing the forward propagation, backpropagation, and impedance adjustment may be repeated to train the neural network (e.g., the loss signal is reduced to have a value below a specified threshold value or range). In some embodiments, the trained neural network may be recast as a traditional neural network that is implementable in computer hardware.

Figure 4:
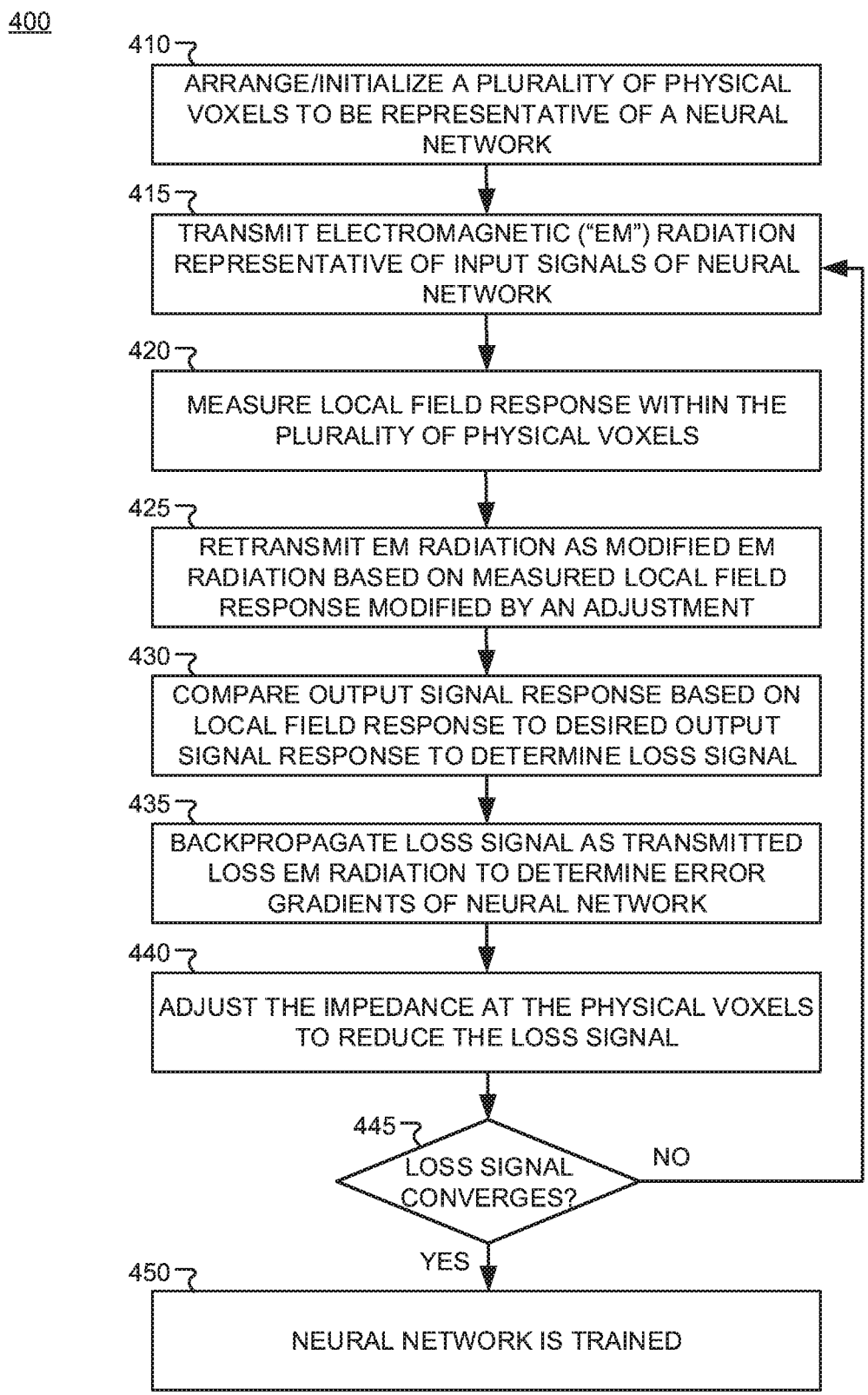
FIG. 4 illustrates a method for operating and training a plurality of physical voxels to simulate a neural network, in accordance with an embodiment of the present disclosure.

FIG. 4 illustrates a method 400 for operating and training a plurality of physical voxels to simulate a neural network, in accordance with an embodiment of the present disclosure. Method 400 is one possible implementation of physically simulating a neural network via a physical electromagnetics simulator such as system 100 illustrated in FIG. 1.

Referring back to FIG. 4, block 410 illustrates arranging physical voxels (e.g., physical voxels 102 illustrated in FIG. 1) within a simulation stage (e.g., the simulation stage 101 illustrated in FIG. 1) to be representative of a neural network, in which the physical voxels correspond to nodes of the neural network. Each of the physical voxels is a real-world physical voxel that operates in response to electromagnetic radiation at a first frequency to physically simulate the neural network. In one embodiment, the first frequency may be one or more frequencies within the radio frequency band (e.g., approximately between 3 kHz to 300 GHz). In one embodiment, a first portion, a second portion, and a third portion of the physical voxels may be respectively arranged within an input layer region, a hidden layer region, and an output layer region, which respectively correspond to the input layer, one or more hidden layers, and output layer of the neural network. In other words, the physical voxels are arranged to represent the topology of neural network. It is noted that in some embodiments, each of the physical voxels is designed to have a material property responsive to electromagnetic radiation propagating through or otherwise received by the physical voxel. The impedance to electromagnetic radiation received by the individual physical voxels may be configurable (e.g., via impedance adjuster 128 illustrated in FIG. 1). More specifically, weights between individual nodes of the neural network are based, at least in part, on the configured impedance of the physical voxels. Furthermore, each of the physical voxels may have various functionalities to transmit, receive, and/or measure electromagnetic radiation. Arranging the physical voxels may include setting an initial parameter for material properties (e.g., index of refraction, resonant frequency, dielectric constant) of each of the physical voxels to define or describe initial parameters of the neural network (e.g., degree of interconnectedness between nodes, weight values between nodes, topology, and the like). This may correspond to uploading (e.g., via system controller 150 of FIG. 1) a hardware descriptor of the neural network to be physically simulated.

Block 415 illustrates transmitting electromagnetic radiation representative of input signals (i.e., inputs) of the neural network towards physical voxels representative of the output layer of the neural network. The values of the inputs propagate from the input layer to the output layer via one or more hidden layers of the neural network. Impedance to the electromagnetic radiation received by the physical voxels is adjusted by the impedance adjuster of the physical voxels.

Block 420 shows measuring a local field response within the plurality of physical voxels (e.g., with a field detector 126 illustrated in FIG. 1). The local field response is representative of the electromagnetic radiation with the adjusted impedance. A signal adjuster of the physical voxel (e.g., signal adjuster 130 of FIG. 1) is coupled to receive the local field response and apply an adjustment to the received local field response and apply an adjustment (e.g., a non-linear adjustment based on the magnitude of the received local field response) that corresponds to an activation function of the neural network at a corresponding one of the physical voxels.

Block 425 illustrates retransmitting the electromagnetic radiation as modified electromagnetic radiation based on the local field response modified by the adjustment. The modified electromagnetic radiation is transmitted to propagate the inputs to the next layer of the neural network (e.g., from input layer to hidden layer, from hidden layer to hidden layer, or from hidden layer to output layer). The measurement of the local field response at a particular layer of the neural network is followed by transmission of the modified electromagnetic radiation towards the next layer of the neural network. This process is repeated until the electromagnetic radiation propagates to the output layer of the neural network, in which the local field response measured within the physical voxels within the output layer region correspond to an output signal response of the neural network. In some embodiments, blocks 410-425 may correspond to forward propagation (e.g., for inference or a portion of training) of the neural network. For inference, the output signal response may be used to determine the answer (e.g., result) of the forward propagation. The output signal response corresponds to measuring the local field response within the physical voxels associated with the output layer of the neural network. For training, block 425 proceeds to block 430.

Block 430 shows comparing the output signal response, based on the local field response within the physical voxels corresponding to the output layer of the neural network, to a desired output signal response to determine a loss signal. The loss signal may correspond to a squared difference between the output signal response and the desired output signal.

Block 435 illustrates backpropagating the loss signal as transmitted loss electromagnetic radiation to determine error gradients of the neural network. More specifically, the loss signal is output as loss electromagnetic radiation that is transmitted towards the input layer region. The physical voxels receiving the loss electromagnetic radiation measure the local loss field response (e.g., via a field detector) to determine the loss gradient. The loss electromagnetic radiation is backpropagated between layers of the neural network in a manner similar to that of forward propagation (e.g., measurement and retransmission). Once the loss gradient for each of the physical voxels is known, the influence of changes on impedance to the electromagnetic radiation within the physical voxels is able to be determined, which is analogous to determining how changing the weights between interconnected nodes influences the loss signal.

Block 440 shows adjusting the impedance at the physical voxels to reduce the loss signal based, at least in part, on the error gradients. Updating the impedance may correspond to adjusting weights between nodes of the neural network being physically simulated. The impedance is adjusted by an impedance adjuster that changes or configures a material property (e.g., index of refraction, resonant frequency, dielectric constant) of the individual physical voxels that influences incoming waves (e.g., electromagnetic radiation at one or more frequencies).

In one embodiment, the impedance may be adjusted by changing an index of refraction of a corresponding one of the physical voxels (e.g., the physical voxels within the hidden layer region). The index of refraction may be changed by pumping in different fluids into a reservoir operably coupled to a pump included in each of the physical voxels corresponding to at least the hidden layers of the neural network. In the same or other embodiments, the impedance may be adjusted by shifting a resonant frequency of a resonator (e.g., split-ring resonator or otherwise) included in each of the physical voxels. More specifically, in some embodiments, the resonator may be coupled to a PIN diode which is subsequently adapted to shift the resonant frequency of the resonator. The adjustment to the impedance within the hidden layer region corresponds to generating a revised description of the neural network that has weights updated to reduce the loss signal.

Block 445 illustrates determining whether the loss signal substantially converges such that the difference between the measured output signal (e.g., output signal response) and the desired output signal response is within a threshold range (e.g., the neural network has been trained). Iterative cycles of successively performing the forward propagation, performing the backpropagation, and adjusting the impedance to reduce the loss signal may be performed. The cycles may iteratively reduce the loss signal or the loss signal otherwise converges to be within a threshold range (e.g., the neural network is trained). In some embodiments, the loss signal may be reduced using various optimization schemes such as gradient descent. These optimization schemes may be implemented at a local controller level (e.g., local controller 110 of FIG. 1), a system controller level (e.g., system controller 150 of FIG. 1), or a combination thereof.

Block 450 illustrates outputting a trained neural network in which the impedance has been adjusted such that the difference between the output signal response and the desired output signal response is within the threshold range. In some embodiments the trained neural network is recast as a standard neural network to be used for inference in computer hardware.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system for physically simulating a neural network, the system comprising:
   a plurality of physical voxels configurable to represent nodes of the neural network operating in response to electromagnetic radiation, wherein each of the physical voxels includes:
      an impedance adjuster to adjust an impedance to the electromagnetic radiation within a corresponding one of the physical voxels, wherein weights between the nodes of the neural network are based, at least in part, on adjusted impedances including the impedance;
      a field detector, including an antenna, to measure a local field response within the corresponding one of the physical voxels, wherein the local field response is representative of the electromagnetic radiation in a presence of the impedance, wherein the antenna is a detector antenna to measure the local field response within the corresponding one of the physical voxels, and wherein the local field response corresponds to at least one of a measured electric or magnetic field vector in one or more orthogonal directions; and
      a signal adjuster coupled to receive the local field response and apply an adjustment to the local field response, wherein the adjustment corresponds to an activation function of the neural network at the corresponding one of the physical voxels.

2. The system of claim 1, wherein each of the physical voxels further comprises a second antenna coupled to the signal adjuster to transmit modified electromagnetic radiation representative of the local field response modified by the signal adjuster in response to measuring the local field response with the antenna.

3. The system of claim 2, wherein the neural network operates in response to the electromagnetic radiation at a first frequency within a radio frequency range.

4. The system of claim 3, wherein the modified electromagnetic radiation is transmitted at a second frequency equal to the first frequency, wherein the modified electromagnetic radiation is representative of the electromagnetic radiation with at least one of a phase or amplitude adjusted by the impedance adjuster and the signal adjuster.

5. The system of claim 1, wherein, for each of the physical voxels, the antenna associated with the corresponding one of the physical voxels is time shared to measure the local field response and transmit modified electromagnetic radiation representative of the local field response modified by the signal adjuster.

6. The system of claim 5, wherein the neural network operates in response to the electromagnetic radiation at a first frequency within a radio frequency range, and wherein the modified electromagnetic radiation is transmitted at a second frequency equal to the first frequency, wherein the modified electromagnetic radiation is representative of the electromagnetic radiation with at least one of a phase or amplitude adjusted by the impedance adjuster and the signal adjuster.

7. The system of claim 1, wherein the signal adjuster applies a nonlinear adjustment to the received local field response dependent on a magnitude of the received local field response.

8. The system of claim 7, wherein the signal adjuster includes at least one of an attenuator, a variable gain amplifier, a diode, or an inductor to nonlinearly adjust the local field response.

9. The system of claim 7, wherein each of the physical voxels further comprises a second antenna coupled to the signal adjuster to transmit modified electromagnetic radiation representative of the local field response modified by the signal adjuster, and wherein the signal adjuster includes a ferrite-core coupled to the second antenna to apply the adjustment to the local field response.

10. The system of claim 1, further comprising:
a simulation stage to arrange the physical voxels within one, two, or three dimensions to be representative of a topology of the neural network.

11. The system of claim 10, wherein a degree of interconnectedness between nodes of the neural network as described by the topology of the neural network is based, at least in part, on separation distances between the physical voxels.

12. The system of claim 10, wherein the topology of the neural network includes an input layer, two or more hidden layers, and an output layer, and wherein a first portion, a second portion, and a third portion of the physical voxels are arranged to respectively correspond to the input layer, the two or more hidden layers, and the output layer.

13. The system of claim 1, wherein the impedance adjuster for each of the physical voxels includes a resonator coupled to a PIN diode, wherein the PIN diode is adapted to shift a resonant frequency of the resonator to adjust the impedance of the electromagnetic radiation within the corresponding one of the physical voxels.

14. The system of claim 1, wherein each of the physical voxels has a configurable index of refraction, and wherein the impedance adjuster is adapted to change the index of refraction within a support structure of the corresponding one of the physical voxels to adjust the impedance.

15. A method for operating a plurality of physical voxels arranged to represent a neural network, the method comprising:
transmitting electromagnetic radiation towards a plurality of physical voxels, wherein the physical voxels are representative of nodes of the neural network, and wherein the electromagnetic radiation corresponds to input signals of the neural network;
measuring a local field response at each of the physical voxels with a respective detector antenna included in each of the physical voxels;
adjusting impedances experienced by the electromagnetic radiation within the physical voxels, wherein weights between nodes of the neural network are based, at least in part, on the impedances as adjusted; and
retransmitting the electromagnetic radiation as modified electromagnetic radiation based on the local field response at each of the physical voxels, wherein the modified electromagnetic radiation is representative of the local field response modified by adjustments that correspond to activation functions of the neural network at corresponding ones of the physical voxels.

16. The method of claim 15, wherein the electromagnetic radiation and the modified electromagnetic radiation are transmitted at a first frequency within a radio frequency range.

17. The method of claim 15, wherein at least one of the adjustments is a nonlinear adjustment based, at least in part, on a magnitude of the measured local field response.

18. The method of claim 17, wherein the local field response as measured by the corresponding ones of the physical voxels is representative of a summation of the input signals modified by the weights.

19. The method of claim 15, further comprising:
determining an output signal response of the neural network based, at least in part, on the measured local field response;
comparing the output signal response to a desired output signal response to determine a loss signal;
backpropagating the loss signal as transmitted loss electromagnetic radiation towards the physical voxels to determine error gradients of the neural network by measuring a loss field response at each of the physical voxels when transmitting the loss electromagnetic radiation; and
updating at least one of the impedances of the physical voxels based, at least in part, on the error gradients to reduce the loss signal.

20. The method of claim 19, wherein the output signal is measured by a portion of the physical voxels arranged to correspond to an output layer of the neural network.

21. A system for physically simulating a neural network, the system comprising:
a plurality of physical voxels configurable to represent nodes of the neural network operating in response to electromagnetic radiation, wherein each of the physical voxels includes:
an impedance adjuster to adjust an impedance to the electromagnetic radiation within a corresponding one of the physical voxels, wherein weights between the nodes of the neural network are based, at least in part, on adjusted impedances including the impedance;
a field detector to measure a local field response within the corresponding one of the physical voxels, wherein the local field response is representative of the electromagnetic radiation in a presence of the impedance; and
a signal adjuster coupled to receive the local field response and apply an adjustment to the local field response, wherein the adjustment corresponds to an activation function of the neural network at the corresponding one of the physical voxels, wherein the signal adjuster applies a nonlinear adjustment to the received local field response dependent on a magnitude of the received local field response, and wherein the signal adjuster includes at least one of an attenuator, a variable gain amplifier, a diode, or an inductor to nonlinearly adjust the local field response.

22. A system for physically simulating a neural network, the system comprising:
a plurality of physical voxels configurable to represent nodes of the neural network operating in response to electromagnetic radiation, wherein each of the physical voxels includes:
an impedance adjuster to adjust an impedance to the electromagnetic radiation within a corresponding one of the physical voxels, wherein weights between the nodes of the neural network are based, at least in part, on adjusted impedances including the impedance;
a field detector to measure a local field response within the corresponding one of the physical voxels, wherein the local field response is representative of the electromagnetic radiation in a presence of the impedance; and a signal adjuster coupled to receive the local field response and apply an adjustment to the local field response, wherein the adjustment corresponds to an activation function of the neural network at the corresponding one of the physical voxels; and an antenna coupled to the signal adjuster to transmit modified electromagnetic radiation representative of the local field response modified by the signal adjuster.

23. A system for physically simulating a neural network, the system comprising:

a plurality of physical voxels configurable to represent nodes of the neural network operating in response to electromagnetic radiation, wherein each of the physical voxels includes:

an impedance adjuster to adjust an impedance to the electromagnetic radiation within a corresponding one of the physical voxels, wherein weights between the nodes of the neural network are based, at least in part, on adjusted impedances including the impedance, wherein the impedance adjuster includes a resonator coupled to a PIN diode, wherein the PIN diode is adapted to shift a resonant frequency of the resonator to adjust the impedance of the electromagnetic radiation within the corresponding one of the physical voxels;

a field detector to measure a local field response within the corresponding one of the physical voxels, wherein the local field response is representative of the electromagnetic radiation in a presence of the impedance; and a signal adjuster coupled to receive the local field response and apply an adjustment to the local field response, wherein the adjustment corresponds to an activation function of the neural network at the corresponding one of the physical voxels.

* * * * *